United States Patent
Hayashita

(10) Patent No.: US 7,668,995 B2
(45) Date of Patent: Feb. 23, 2010

(54) IIC BUS COMMUNICATION SYSTEM CAPABLE OF SUPPRESSING FREEZE OF IIC BUS COMMUNICATION AND METHOD FOR CONTROLLING IIC BUS COMMUNICATION

(75) Inventor: Hiroyuki Hayashita, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/369,953

(22) Filed: Feb. 12, 2009

(65) Prior Publication Data
US 2009/0157931 A1    Jun. 18, 2009

Related U.S. Application Data

(62) Division of application No. 11/557,788, filed on Nov. 8, 2006, now Pat. No. 7,509,446.

(30) Foreign Application Priority Data

Nov. 15, 2005  (JP) ............... 2005-330744
Oct. 11, 2006  (JP) ............... 2006-277720

(51) Int. Cl.
  *G06F 13/00*  (2006.01)
(52) U.S. Cl. ...................... 710/110; 710/105
(58) Field of Classification Search ........... 710/105, 710/110
  See application file for complete search history.

(56) References Cited

U.S. PATENT DOCUMENTS 5,903,737 A *  5/1999 Han ..................... 710/100
6,728,908 B1  4/2004 Fukuhara et al.
7,016,993 B2  3/2006 Lee
7,174,473 B2 *  2/2007 Musumeci et al. ........... 713/400
7,509,446 B2 *  3/2009 Hayashita .................... 710/110
7,521,963 B1 *  4/2009 Xin-LeBlanc ................ 326/63

(Continued)

FOREIGN PATENT DOCUMENTS

JP    2003-308257    10/2003

OTHER PUBLICATIONS

The I2C-Bus Specification, Version 2.1; Philips Semiconductors; Jan. 2000.*

*Primary Examiner*—Glenn A Auve
(74) *Attorney, Agent, or Firm*—Hamre, Schumann, Mueller & Larson, P.C.

(57) ABSTRACT

Multiple master devices and multiple slave devices are connected in parallel to two bus lines including a SCL line 1 and a SDA line 2, and a pullup resistor is connected between the bus lines and a power source. A state detector detects a frozen state on the basis of the states of the SCL line and SDA line and outputs a freeze detection signal, and it detects a freeze released state so as to output a freeze-release detection signal. A pulse generator supplies a pulse signal corresponding to a clock signal to the SCL line in accordance with the freeze-release detection signal. A reset signal generator sends a reset signal to the multiple master devices in accordance with the freeze-release detection signal. The multiple master devices return to the normal communication state in accordance with the supply of the reset signal. It is possible to restore the system even when the slave device returns an acknowledge signal for an incorrect bit and the IIC bus communication freezes.

3 Claims, 8 Drawing Sheets

U.S. PATENT DOCUMENTS

| | | |
|---|---|---|
| 2004/0153726 A1 | 8/2004 | Suzuki |
| 2006/0069831 A1 | 3/2006 | Moriwaki et al. |
| 2006/0153326 A1* | 7/2006 | Choi .......................... 375/360 |
| 2006/0242348 A1 | 10/2006 | Humphrey et al. |
| 2007/0234136 A1* | 10/2007 | Leef et al. ................... 714/704 |
| 2007/0240019 A1 | 10/2007 | Brady et al. |
| 2008/0215780 A1* | 9/2008 | Deshpande et al. ......... 710/110 |

* cited by examiner (a)

(b)

(a)

(b)

IIC BUS COMMUNICATION SYSTEM CAPABLE OF SUPPRESSING FREEZE OF IIC BUS COMMUNICATION AND METHOD FOR CONTROLLING IIC BUS COMMUNICATION

This application is a division of U.S. Ser. No. 11/557,788, filed Nov. 8, 2006 which application is incorporated herein by reference.

BACKGROUND OF THE INVENTION

1. Field of the Invention

The present invention relates to measures against a freeze and improvement in noise tolerance in an IIC communication system.

2. Description of Related Art

An IIC (Inter-Integrated Circuit) bus communication has been known as a communication method using a bi-directional bus including two wires, which is applied for controlling efficiently devices integrated in household equipment (such as television sets, radio sets and DVD recorders), communication equipment (such as mobile phones and personal computers) or industrial equipment. IIC bus specification is defined in, for example, "THE I²C-BUS SPECIFICATION", VERSION 2.1, JANUARY 2000.

By using such an IIC bus communication, the system control can be composed of only two bus lines including a serial data (SDA) line and a serial clock (SCL) line. Moreover, since addressing and data-transmission format and devices are defined in the IIC specification, system definition by the use of software is available, and the addition/removal of IC in the system can be performed in a simple manner. Every device connected to the bus has its own unique address and it operates as a transmitter or a receiver in accordance with the function of the equipment, and data can be transmitted between the respective devices.

A relationship as a master device and a slave device is established constantly between the respective devices, and the master device functions as a master transmitter or a master receiver. The master device denotes a device for starting data transmission on a bus, and it generates a clock signal for enabling the transmission. A device that is addressed at that time by the master device becomes a slave device. The length of each byte outputted to the SDA line is 8 bits. The number of bytes that can be sent at one transmission is not limited particularly. An acknowledge bit is required after each byte. A clock pulse for the acknowledge bit is generated by the master device. When such an acknowledge clock pulse is generated, the transmitter opens the SDA line. The receiver is required to make the SDA line "L" in accordance with the output of the acknowledge clock pulse so that the SDA line is stabilized in the "L" state when the acknowledge clock pulse is in the "H" state.

The IIC bus functions as a multi-master bus where multiple master devices can control a bus simultaneously, and it is expected to be predominant, corresponding to the future trend of higher function of a set and more complicated systems. The fact that multiple master devices can be connected to the IIC bus implies that the multiple master devices may start data transmission simultaneously. For preventing occurrence of such a phenomenon, the IIC bus and all of the IIC bus interfaces are wired-AND-connected. In a case where multiple master devices try to send information to the bus, a master device, which generates '1' first when the other master device generates '0', is disabled to perform a communication. The following description refers to a bit error that occurs at the time of the IIC bus communication.

FIG. 6A is a diagram showing a configuration of a conventional IIC bus system including two master devices. In this system, a first master device 3, a second master device 4, a first slave device 5 and a second slave device 6 are connected in parallel to bus lines including a SCL line 1 and a SDA line 2. In addition, one terminal of a SCL line pullup resistor 7 and one terminal of a SDA line pullup resistor 8 are connected to the SCL line 1 and the SDA line 2 respectively, while the other terminals of the pullup resistors 7, 8 are connected to a power source 9.

FIG. 6B(a) shows waveforms of SCL and SDA during a normal communication in this IIC bus system. The clock pulses S7-S0 in the SCL correspond to respective bits of 1-byte data, and 'A' denotes an acknowledge clock pulse. When the acknowledge clock pulse is in the "H" state, the SDA line is in the "L" state.

FIG. 6B(b) shows a waveform of a state where an acknowledge signal shifts by 1 bit and the communication freezes. This can occur, for example, as a result of the first slave device 5 causing a bit error under the influence of external noise or the like during receiving a slave address at the time that the first master device 3 acquires continuously the read-data from the first slave device 5. As a result, for example, in a case of returning the acknowledge pulse earlier by 1 bit in comparison with the acknowledge bit, the slave device sets the SDA as "L" while the first master device 3 sends the eighth bit of the slave address as "H". The first master device 3 recognizes this phenomenon as the second master device 4 trying to start data transmission, and stops supplying of a clock to the SCL line 1. As a result, since the clock is not supplied to the SCL line 1, the SDA line 2 is pulled to "L" by the first slave device 5, and the IIC bus communication will freeze.

JP2003-308257 A describes an example of techniques for coping with abnormal communications in an IIC bus communication system. The technique described in JP2003-308257 A relates to a method for preventing a malfunction or a runaway of a slave device when resuming the communication after interruption of the communication due to the occurrence of an abnormality such as a power failure. However, the method cannot be applied to cope with a problem as mentioned above, that is, a freeze of the IIC bus communication under the influence of external noise or the like.

FIG. 7 is a block diagram showing the interior of the first slave device 5. FIG. 7 shows only parts relating to processing the SCL signal inputted through a SCL input terminal 10, but parts relating to processing SDA signal are omitted in the figure.

The SCL signal is decoded at an IIC decoding circuit 12 via a comparator 11a in the first slave device 5. For the reference voltage of the comparator 11a, an output voltage of a reference voltage circuit 13 is supplied via a buffer circuit 14. The output voltage of the reference voltage circuit 13 via the buffer circuit 14 is supplied also to the IIC decoding circuit 12.

The following factors can be considered as causing a shift of the acknowledge signal in the circuit of the first slave device 5:

(1) external noise is superimposed on the SCL line 1;
(2) noise is superimposed on the reference voltage side of the comparator 11a; and
(3) noise is superimposed on the output of the comparator 11a.

When the first slave device 5 returns an acknowledge signal for an incorrect bit due to the influences of external noises or the like as mentioned above, a freeze of the IIC bus communication is apt to be caused.

SUMMARY OF THE INVENTION

Therefore, with the foregoing in mind, it is an object of the present invention to provide an IIC bus communication system that can restore the system in a case where a slave device returns an acknowledge signal for an incorrect bit and the IIC bus communication freezes.

It is also an object of the present invention to provide an IIC bus communication system that can suppresses a freeze of the IIC bus communication even when the slave device returns an acknowledge signal for an incorrect bit.

It is also an object of the present invention to improve the noise tolerance of the internal circuit of the slave device in order to suppress a freeze of the IIC bus communication even when the noise is superimposed on a signal outside or inside the slave device.

A first IIC bus communication system of the present invention includes: two bus lines including a SCL (serial clock) line and a SDA (serial data) line; multiple master devices connected in parallel to the bus lines; a state detector for detecting a frozen state of the IIC bus communication on the basis of the states of the SCL line and the SDA line so as to output a freeze detection signal, and detecting the state where the frozen state is released so as to output a freeze-release detection signal; a pulse generator for supplying a pulse signal corresponding to a clock signal with respect to the SCL line in accordance with the freeze detection signal outputted from the state detector; and a reset signal generator for supplying a reset signal to the multiple master devices in accordance with the freeze-release detection signal outputted from the state detector, wherein the multiple master devices return to the normal communication state in accordance with the supply of the reset signal.

A second IIC bus communication system of the present invention includes: two bus lines including a SCL line and a SDA line; multiple master devices connected in parallel to the bus lines; a STA control line for connecting the multiple master devices; and pullup resistor connected between the STA control line and a power source, wherein the master device to start a communication sends in advance a recognition signal STA for starting communication to the STA control line for a predetermined period, and the master device in communication stops the SCL when detecting, through the STA control line, that the recognition signal STA is sent.

A third IIC bus communication system of the present invention includes: two bus lines including a SCL line and a SDA line; multiple master devices connected in parallel to the bus lines; multiple slave devices connected in parallel to the bus lines; a pullup resistor connected at one terminal to the SCL line and the SDA line respectively; a power source connected to the other terminal of the pullup resistor, a RESET control line for connecting the multiple master devices and the multiple slave devices; and a pullup resistor connected between the RESET control line and the power source, wherein the multiple master devices are capable of self-checking the IIC signal based on an IIC specification so as to send a reset signal to the RESET control line when a bit error occurs, and the multiple slave devices reset the state corresponding to the bit error when the reset signal is sent through the RESET control line.

A slave device for an IIC bus communication system of the present invention includes: a SCL terminal to be connected to a SCL line of the IIC bus communication system; a SDA terminal to be connected to a SDA line of the IIC bus communication system; a SCL comparator for outputting. a result of comparison between a SCL signal inputted via the SCL terminal and a reference voltage; a SDA comparator for outputting a result of comparison between a SDA signal inputted via the SDA terminal and a reference voltage; and a decoder to be supplied with outputs from the SCL comparator and the SDA comparator, wherein at least one of the SCL comparator and the SDA comparator is a hysteretic comparator.

A first IIC bus communication control method for controlling an IIC bus communication system including two bus lines including a SCL line and a SDA line and multiple master devices connected in parallel to the bus lines includes the steps of: monitoring states of the SCL line and the SDA line; detecting the frozen state of the IIC bus communication and the state where the frozen state is released, on the basis of the states of the SCL line and the SDA line; when the frozen state is detected, supplying a pulse signal corresponding to the clock signal to the SCL line; and when detecting the state where the frozen state is released, sending a reset signal to the multiple master devices so that the multiple master devices return to the normal communication state.

According to a second IIC bus communication control method for controlling an IIC bus communication system including two bus lines including a SCL line and a SDA line and multiple master devices connected in parallel to the bus lines, the master device to start a communication sends a recognition signal STA for starting communication to all of the remaining master devices in advance for a predetermined period; and the master device in communication controls to stop the SCL when detecting that the recognition signal STA is sent.

According to a third IIC bus communication control method for controlling an IIC bus communication system including two bus lines including a SCL line and a SDA line, multiple master devices connected in parallel to the bus lines and multiple slave devices connected in parallel to the bus lines, the multiple master devices are capable of self-checking the IIC signal so as to send a reset signal to all of the remaining master devices and all of the slave devices when a bit error occurs; and the multiple slave devices control so as to reset a state caused by the bit error when the reset signal is sent.

DETAILED DESCRIPTION OF THE INVENTION

Figure 1A:
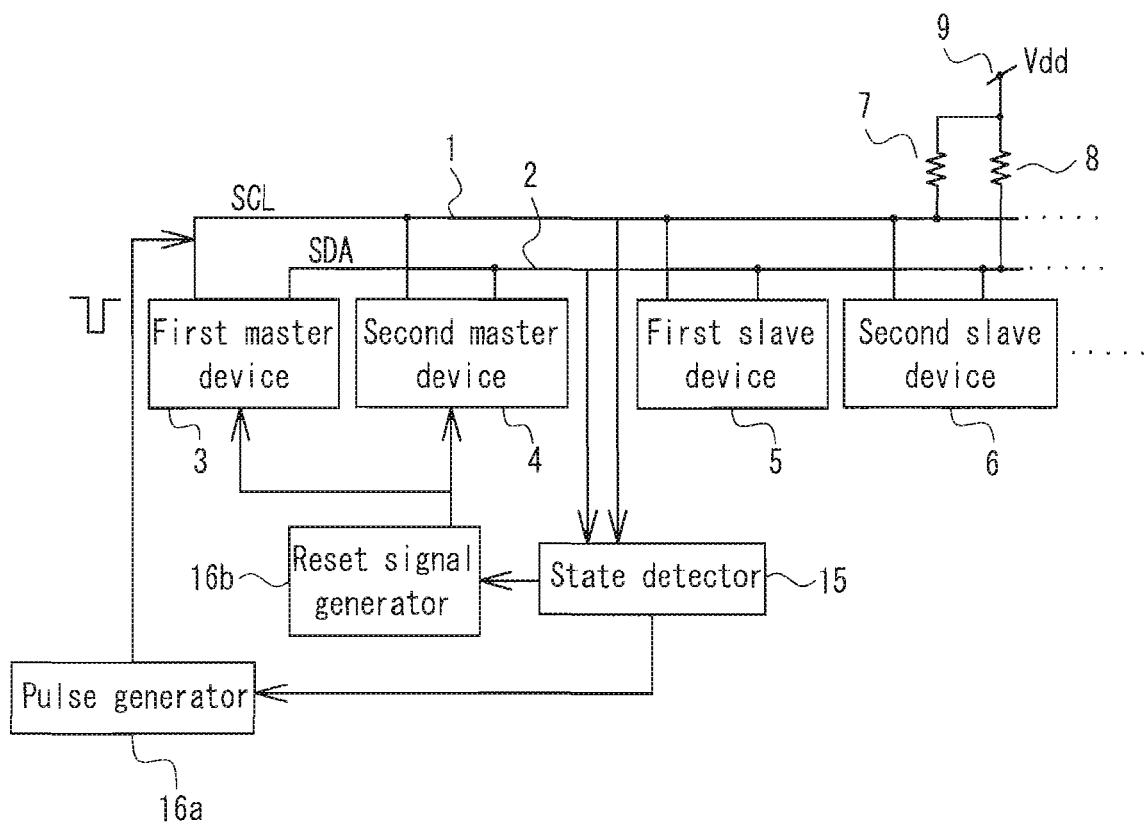
FIG. 1A is a block diagram showing a configuration of an IIC bus communication system according to a first embodiment of the present invention.

According to a first configuration of an IIC bus communication system and an IIC bus communication control method of the present invention, it is possible to detect that the IIC bus communication freezes and to input a clock pulse into the SCL line so as to release the frozen state and return to the normal communication state.

In the first configuration of an IIC bus communication system, the state detector can be configured to detect the frozen state by detecting that predetermined states of the SDA and SCL continue for a predetermined period.

Furthermore, in the IIC bus communication control method, the detection of the frozen state can be carried out by detecting that the predetermined states of the SDA and SCL continue for a predetermined period.

According to a second configuration of an IIC bus communication system and an IIC bus communication control method of the present invention, since the master device continues to input a clock for communication unless the other master devices send a recognition signal STA in order to start communication, a freeze of the IIC bus communication can be prevented.

According to a third configuration of an IIC bus communication system and an IIC bus communication control method of the present invention, since a reset signal is sent to reset the respective master devices in a case of detecting a bit error by the self-checking function of the IIC included in the master devices, a freeze of the IIC bus communication can be prevented.

According to the slave device of the IIC bus communication system of the present invention, the occurrence of a bit error due to the influence of noise superimposed on the signal outside/inside the device can be reduced by use of a hysteretic comparator 11c. As a result, the noise tolerance of the slave device can be improved to suppress occurrence of a freeze in the IIC bus communication.

In the slave device of the IIC bus communication system of the present invention, it is preferable that a capacitor for noise rejection is connected to the output side of at least one of the SCL comparator and the SDA comparator.

It is also preferable that the reference voltage to be supplied to at least one of the SCL comparator and the SDA comparator is supplied from a reference voltage source different from the reference voltage source that supplies the reference voltage to the decoder.

The slave device can have a power source input terminal to be connected to the power source and voltage division resistors connected between the power source input terminal and a ground, and a voltage of the power source, which is divided by the resistor, can be used as the reference voltage to be supplied to at least one of the SCL comparator and the SDA comparator.

It is also preferable that a buffer circuit is connected to the output side of at least one of the SCL comparator and the SDA comparator in order to lower the output impedance.

Equipment for a IIC bus communication system of the invention may include a device that is applicable in any of the above-mentioned IIC bus communication systems, wherein the device is configured as a slave device. The equipment can be a television set, a radio set, a DVD recorder, a mobile phone, a personal computer or industrial equipment.

Hereinafter, the present invention will be described by way of illustrative embodiments with reference to the drawings.

Embodiment 1

Figure 6A:
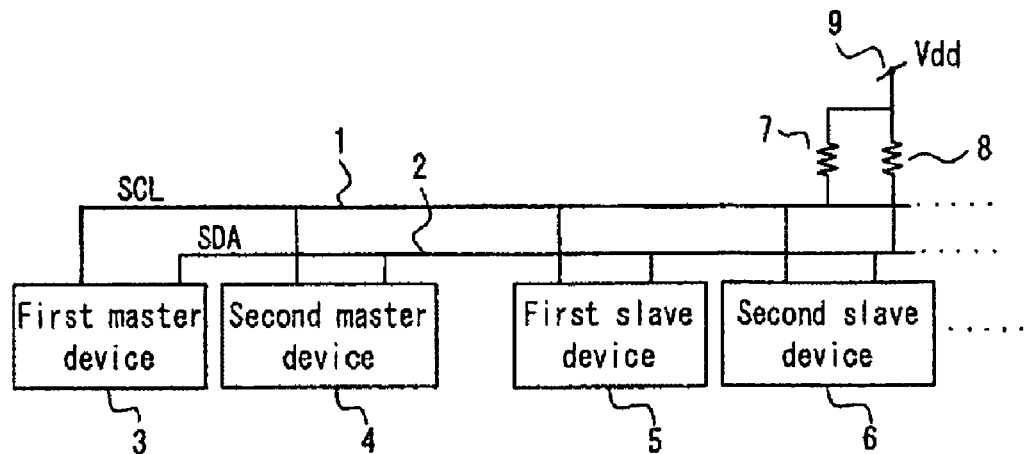
FIG. 6A is a block diagram showing a configuration of a conventional IIC bus communication system.
Figure 6B:
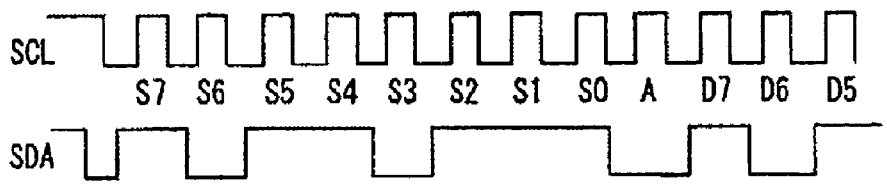
FIG. 6B is a diagram showing IIC signal waveforms of a conventional IIC bus communication system.
Figure 6B:
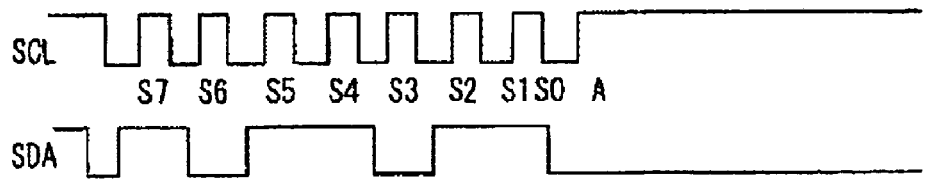
Figure 7:
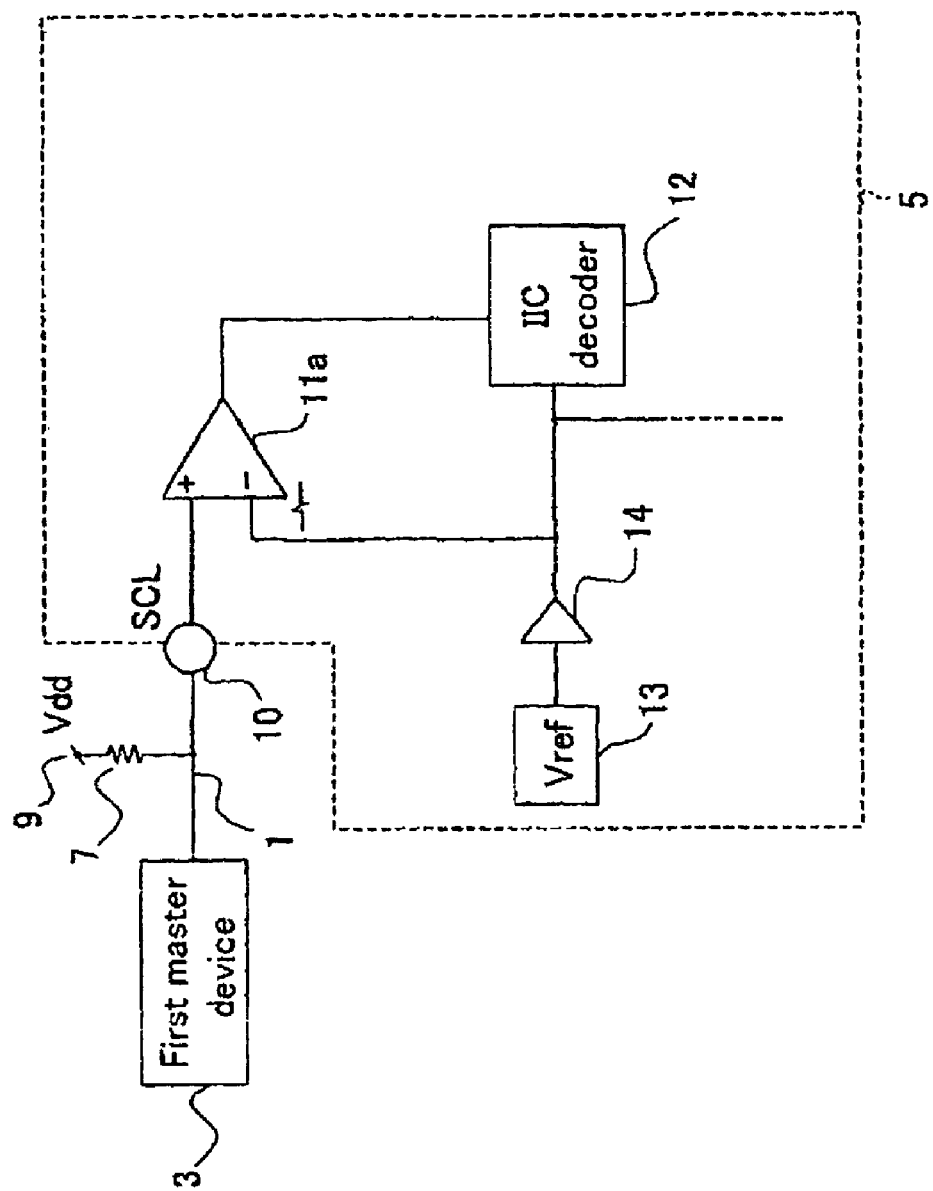
FIG. 7 is a block diagram showing a configuration of a conventional slave IC circuit.

FIG. 1A is a block diagram showing a configuration of an IIC bus communication system according to a first embodiment of the present invention. In FIG. 1A, the same reference numerals may be assigned to the same components comparable to as those of the conventional IIC bus communication system as shown in FIG. 6A.

This IIC bus communication system is configured by connecting a first master device 3, a second master device 4, a first slave device 5 and a second slave device 6 in parallel to bus lines including a SCL line 1 and a SDA line 2. One terminal of a SCL line pullup resistor 7 and one terminal of a SDA line pullup resistor 8 are connected to the SCL line and the SDA line respectively, and the other terminals of the pullup resistors 7, 8 are connected to a power source 9.

Furthermore, for providing a function of coping with a freeze, a combination of a state detector 15, a pulse generator 16a, and a reset signal generator 16b is provided. The state detector 15 is connected to the SCL line 1 and the SDA line 2 so that both a SCL signal and a SDA signal are inputted in order to detect the frozen state of the SCL line 1 and the SDA line 2 and also detect a release of the freeze, on the basis of the states of the signals.

The freeze detection signal and the freeze-release detection signal as output signals from the state detector 15 are supplied to the pulse generator 16a and the reset signal generator 16b. The pulse generator 16a supplies a pulse signal corresponding to the clock signal to the SCL line 1, in accordance with the freeze detection signal outputted from the state detector 15. The reset signal generator 16b sends a reset signal to the first master device 3 and the second master device 4 in accordance with the freeze-release detection signal outputted from the state detector 15. The first master device 3 and the second master device 4 return to the normal communication state by being supplied with a reset signal.

Figure 1B:
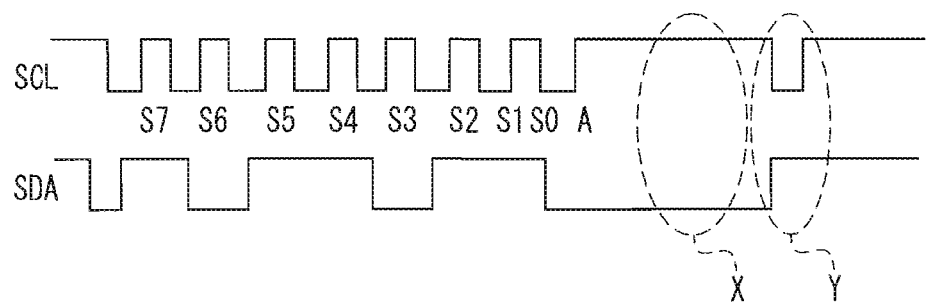
FIG. 1B is a diagram showing IIC signal patterns in the IIC bus communication system.

Next, an operation for coping with a freeze of the IIC bus communication system in this embodiment will be described below by referring to FIG. 1B. FIG. 1B shows waveforms of SCL and SDA in a case where the first slave device 5 returns an acknowledge signal earlier by 1 bit in the system of FIG. 1A.

In a case where the first slave device 5 double-counts the SDA at the seventh bit under the influence of noise or the like while the first master device 3 receives continuously data of the first slave device 5 (read address: B7_Hex), the SDA is pulled to "L" at the fall of the seventh bit in SCL. Since the eighth bit of the read address has been sent at the first master device 3, it recognizes that the second master device 4 pulls the SDA line to "L" in an attempt to start a communication and stops the SCL. As a result, the bus lines will freeze and they will be fixed to a frozen state X (SCL: "H", and SDA: "L"). The state detector 15 is formed to detect that the frozen state X continues for a predetermined period.

When detecting that the frozen state X (SCL: "H", and SDA: "L") continues for a predetermined period, the state detector 15 generates a freeze detection signal and outputs the signal to the pulse generator 16a. Thereby, a pulse signal for 1 clock is inputted from the pulse generator 16a to the SCL line 1. As a result, the first slave device 5 opens the SDA line 2 to "H", and thus the bus line is turned to a released state "Y".

Furthermore, the state detector 15 is configured to detect that the released state Y where the frozen state X is released (SCL: "H", and SDA: "H") continued for a predetermined period. When detecting that the released Y continued for a predetermined period, the state detector 15 outputs a freeze-release detection signal. In response to this, the reset signal generator 16b sends reset signals to the first master device 3 and the second master device 4 so that the first and second master devices 3 and 4 return to the normal communication state.

In a case where the frozen state X continues while the SDA line 2 is fixed to "L", the state detector 15 again generates a freeze detection signal and so the pulse generator 16a outputs a pulse. That is, by the time that the SDA line 2 is released to "H", a dock signal will be inputted continuously from the pulse generator 16a to the SCL line 1. When the frozen state X is released, the first master device 3 and the second master device 4 can be reset, thereby returning to the normal communication state.

It is preferable that the predetermined period for the state detector 15 to detect that the frozen state X and the released state Y continue is set so that the total time period of the frozen state X and the released state Y is shorter than a IIC communication interval. The IIC communication interval denotes an interval for a communication between the master device and the slave device, and it is hundreds of milliseconds in general.

Embodiment 2

Figure 2A:
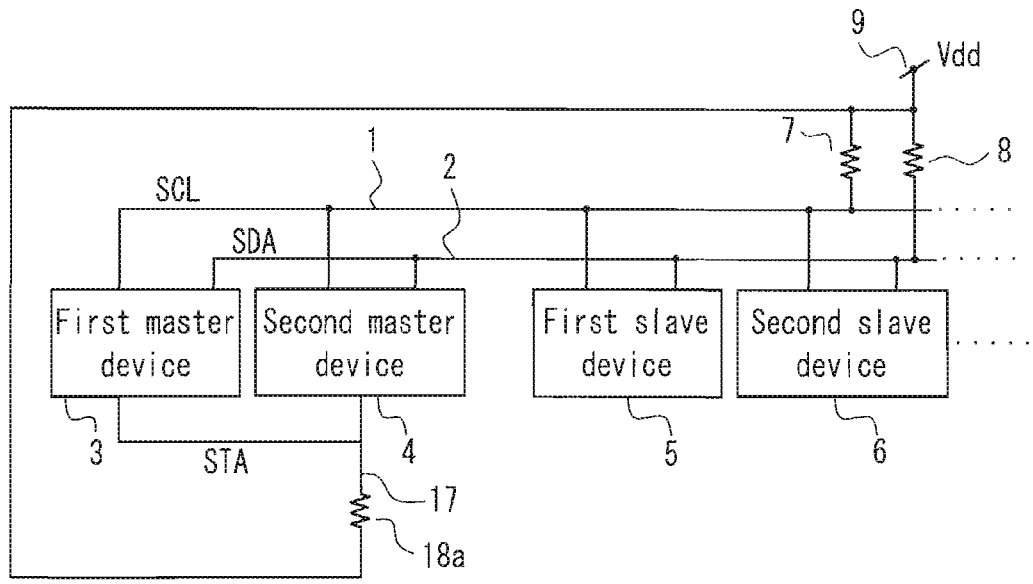
FIG. 2A is a block diagram showing a configuration of an IIC bus communication system according to a second embodiment of the present invention.

FIG. 2A is a block diagram showing a configuration of an IIC bus communication system according to a second embodiment of the present invention. This IIC bus communication system is provided with a STA (start) control line 17 and a STA control line pullup resistor 18a as components for coping with a freeze, in addition to the conventional basic components.

The first master device 3 and the second master device 4 are connected to each other with the STA control line 17, and a master device to start a communication is set to output "L" in advance for a predetermined period to the STA control line 17. The STA control line 17 is open-drain connected within the first master device 3 and the second master device 4 just like the SCL line 1 and the SDA line 2. A STA pullup resistor 18a is connected at one terminal to the STA control line 17 and connected at the other terminal to the power source 9. In this control system, during master communication the first master device 3 or the second master device 4 stops the SCL when detecting that the STA control line 17 is turned to "L".

Next, an action of the IIC bus communication system for coping with a freeze according to this embodiment will be described below by referring to FIG. 2B.

Figure 2B:
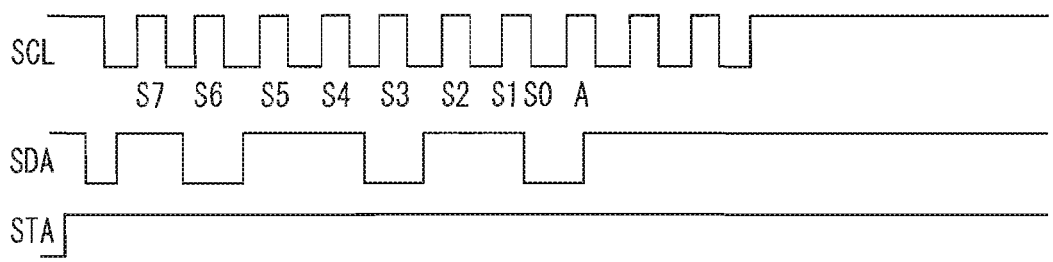
FIG. 2B is a diagram showing IIC signal waveforms and STA signal waveforms in the IIC bus communication system.
Figure 2B:
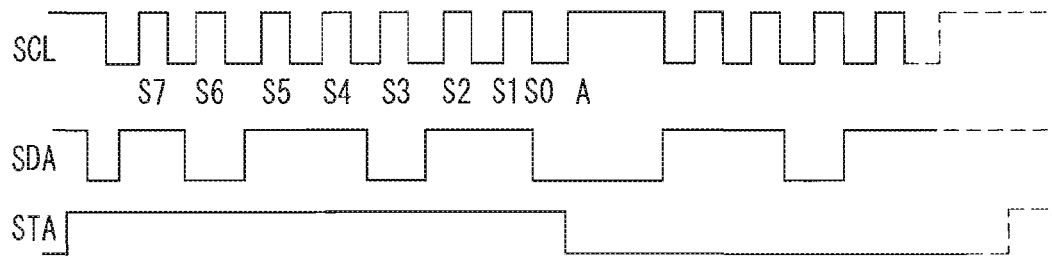

FIG. 2B(a) shows waveforms of the SCL signal, the SDA signal and STA signal in a case where the first slave device 5 returns the acknowledge signal earlier by 1 bit in the system of FIG. 2A and where the master device is not changed. In a case where the first slave device 5 double-counts the SDA at the seventh bit under the influence of noise or the like during the first master device 3 receives continuously the data of the first slave device 5 (read address: B7_Hex), the SDA is pulled to "L" at the fall of the seventh bit of the SCL. However, since the second master device 4 is not trying to start a communication, the STA is kept to "H". As a result, the first master device 3 continues the communication without stopping the SCL, and thus the bus line will not freeze.

FIG. 2B(b) shows waveforms of SCL, SDA and STA in a case where the first slave device 5 returns an acknowledge signal earlier by 1 bit and the second master device 4 interrupts in the midway of the communication by the first master device 3 so that the master devices is changed in the system of FIG. 2A. In a case where the first slave device 5 double-counts the SDA at the seventh bit under the influence of noise or the like during the first master device 3 receives continuously the data of the first slave device 5 (read address: B7_Hex), the SDA is pulled to "L" at the fall of the seventh bit of the SCL. At this timing, the STA control line is set to "L" by the second master device 4 in order to start a communication. As a result, since the first master device 3 stops SCL and since the second master device 4 inputs a STOP condition and a START condition and then starts a communication, the bus lines will not freeze.

Embodiment 3

Figure 3A:
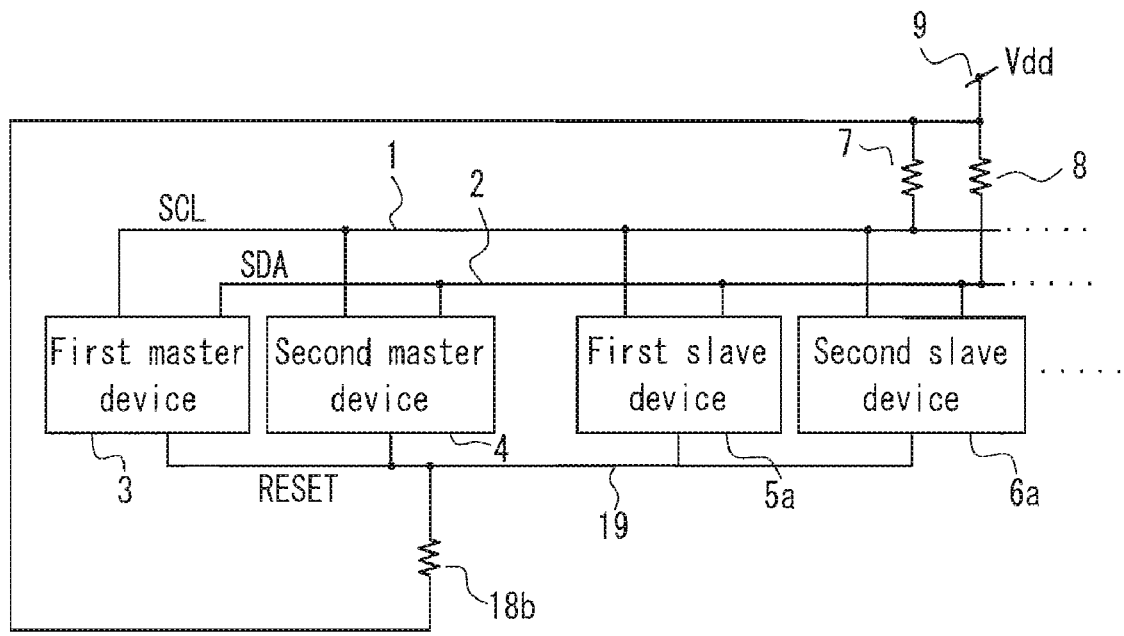
FIG. 3A is a block diagram showing a configuration of an IIC bus communication system according to a third embodiment of the present invention.

FIG. 3A is a block diagram showing a configuration of an IIC bus communication system according to a third embodiment of the present invention. This IIC bus communication system is provided with a RESET control line 19 and a RESET control line pullup resistor 18b as components for coping with a freeze, in addition to the conventional basic components All of the master devices, i.e., the first and second master devices 3, 4 and all of the slave devices, i.e., the first and second slave devices 5a, 6a, are connected to each other with the RESET control line 19. All of the master devices 3, 4 in the control system are capable of self-checking IIC signals, and thus once a bit error occurs, the RESET control line 19 is turned to "L".

Next, the operation of the IIC bus communication system in the present embodiment to cope with a freeze will be described below by referring to FIG. 3B.

Figure 3B:
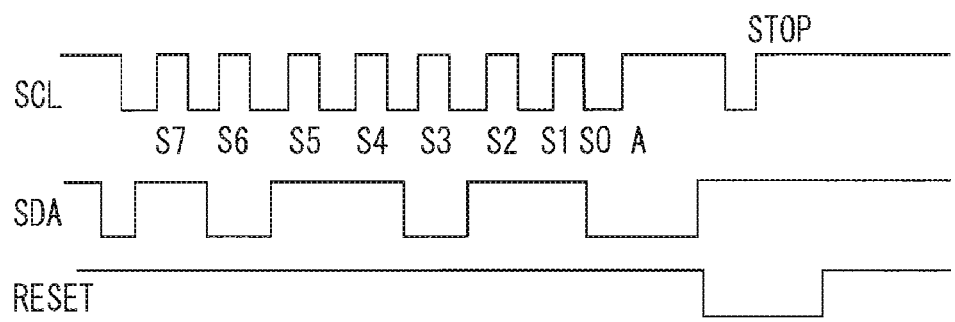
FIG. 3B is a diagram showing IIC signal patterns and a RESET control signal in the IIC bus communication system.

FIG. 3B shows waveforms of SCL, SDA and RESET for a case where the first slave device 5a in the system of FIG. 3A returns the acknowledge signal earlier by 1 bit.

Figure 3C:
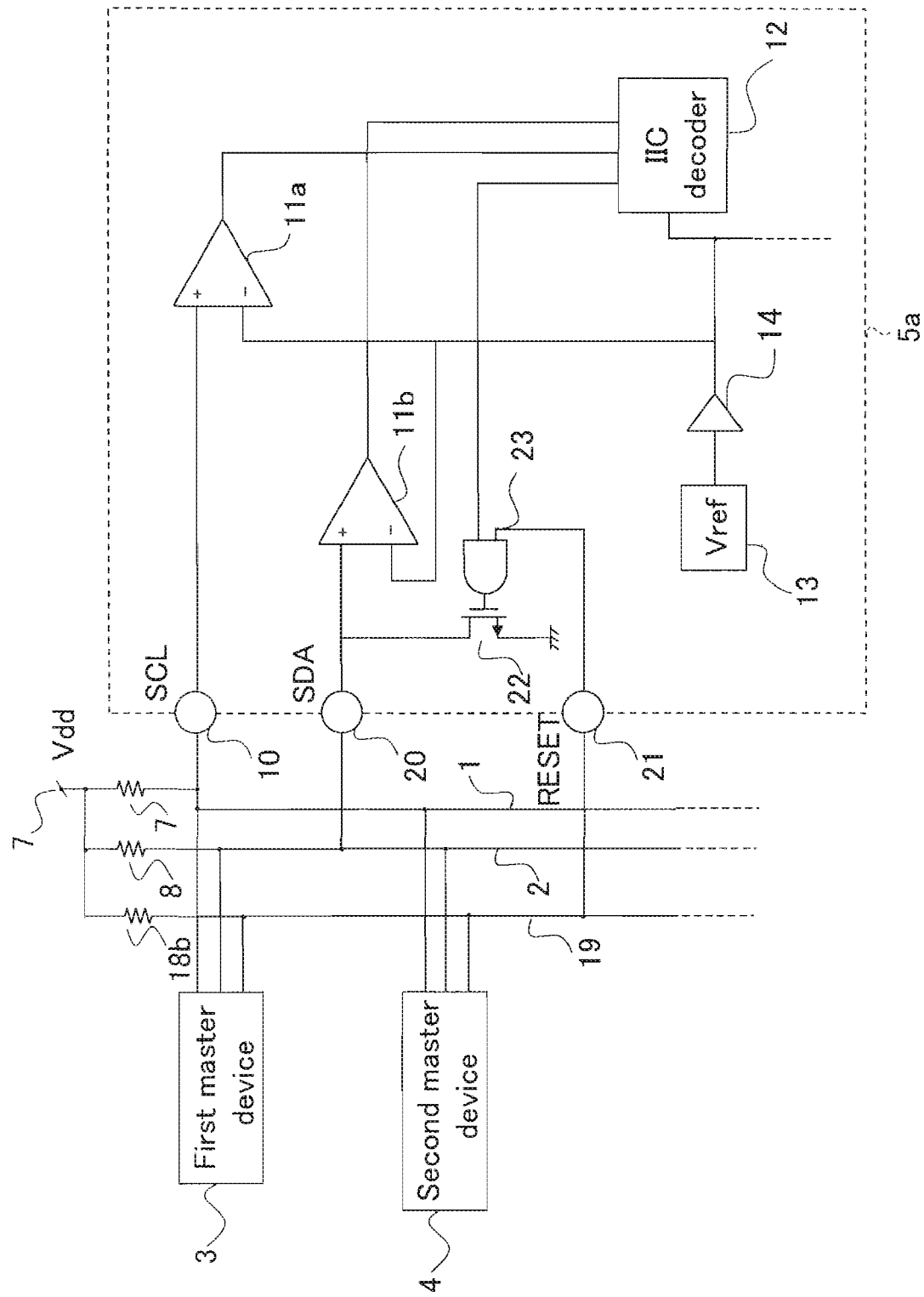
FIG. 3C is a block diagram showing a configuration of a slave IC circuit used in the IIC bus communication system.

FIG. 3C is a block diagram showing a configuration of an IC circuit as the slave device 5a used in the IIC bus communication system in FIG. 3A.

The SCL input terminal 10, the SDA input terminal 20 and the RESET input terminal 21 that are provided in the first slave device 5a are connected respectively to the SCL line 1, the SDA line 2 and the RESET control line 19. The SCL signal and the SDA signal are decoded at the IC decoding circuit 12 via the comparators 11a, 11b in the first slave device 5a. For the reference voltage of the comparators 11a, 11b, a reference voltage from the reference voltage circuit 13 is supplied via the buffer circuit 14.

The SDA input terminal 20 is grounded via a Nch-MOS transistor 22. A decoding output of an IIC decoding circuit 12 is supplied to one of input terminals of an AND circuit 23. The other input terminal of the AND circuit is connected to a RESET input terminal 21.

For example, in a case where the first slave device 5a double-counts the SDA at the seventh bit under the influence of noise or the like while the first master device 3 receives continuously the data of the first slave device 5a (read address: B7_Hex), the SDA is pulled to "L" at the fall of the seventh bit of the SCL.

In this case, although the first master device 3 outputs B7_Hex, the IIC signal becomes B6_Hex due to a shift of the acknowledge bit at the first slave device 5a. The first master device 3 detects this shift of the IIC signal with its integrated IIC self-checking function, and outputs "L" to the RESET control line 19. In the meantime, the first master device 3 generates by itself a STP condition and inputs it into the RESET terminal 21 of the slave device. As a result, the IIC decoding circuit 12 in the slave device is reset and a communication starts normally, and thus the bus lines will not freeze.

Embodiment 4

Figure 4:
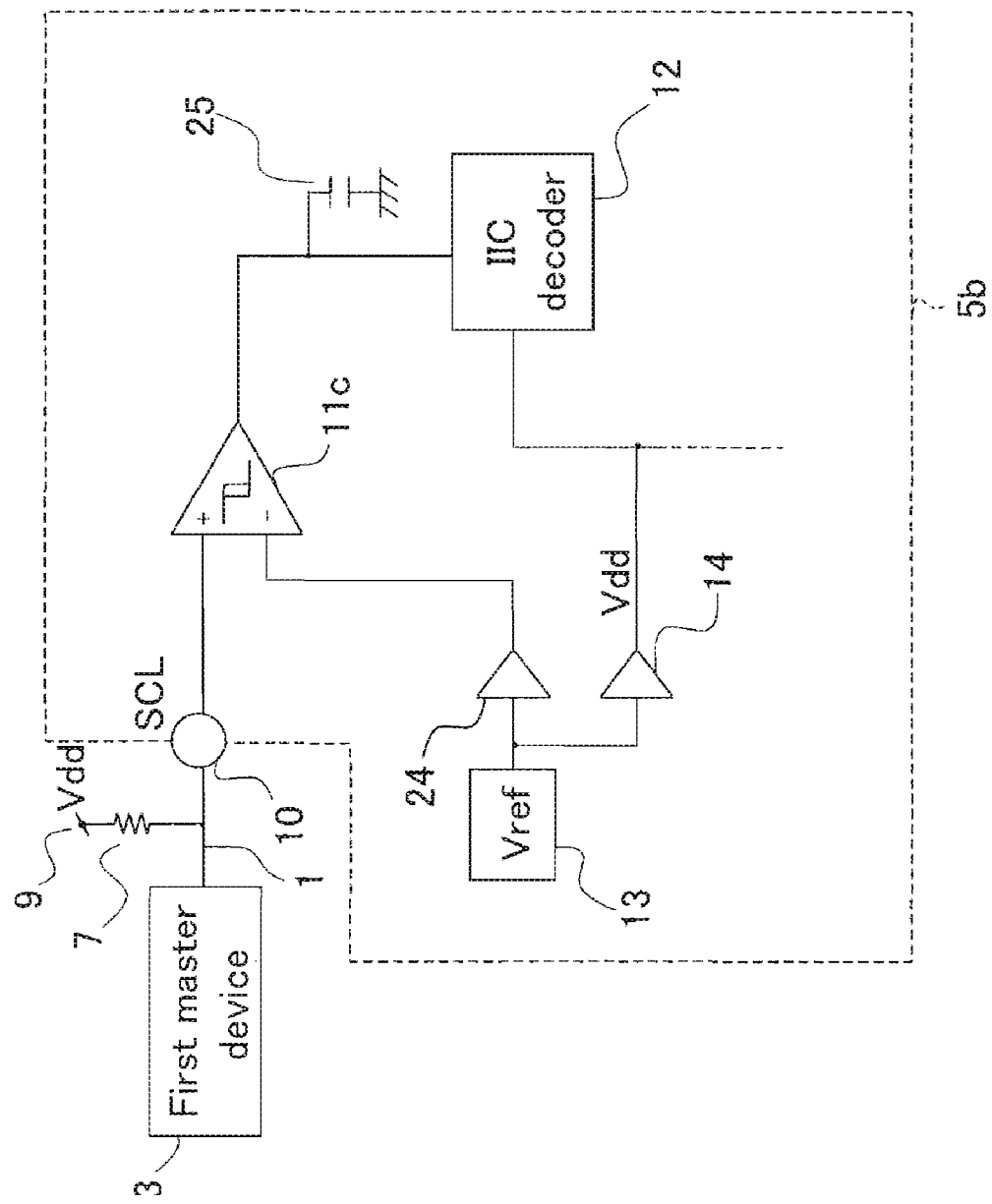
FIG. 4 is a block diagram showing a configuration of a slave IC circuit used in an IIC bus communication system according to a fourth embodiment of the present invention.

FIG. 4 is a block diagram showing a configuration of the slave device 5b used in an IIC bus communication system according to a fourth embodiment of the present invention. The whole configuration of the IIC bus communication system can be similar to the conventional example as shown in FIG. 6A or any of the above-mentioned embodiments. This slave device 5b is shown only at the parts relating to processing a SCL signal to be inputted through the SCL input terminal 10, and parts relating to processing other signals are omitted in the figure.

A SCL signal is supplied to the IIC decoding circuit 12 via a hysteretic comparator 11c and decoded. For the reference voltage of the comparator 11c, an output voltage of a reference voltage circuit 13 is supplied via a buffer circuit 24. That is, the reference voltage of the comparator 11c will be supplied through a path separately from the voltage supplied to the IIC decoding circuit 12. Furthermore, the output side of the comparator 11c is grounded via a noise rejection capacitor 25.

According to the above configuration, measures for improving the noise tolerance inside the slave device 5b can be taken as follows.

(1) The hysteretic comparator 11c is used so that occurrence of bit errors caused by an influence of noise superimposed on the SCL line 1 from the exterior can be reduced.
(2) A logic circuit such as the IIC decoding circuit 12 and a reference bias of the comparator 11c are divided by use of the buffer circuit 24 so that occurrence of bit errors caused by the influence of noise superimposed on the reference voltage side of the comparator 11c can be reduced.
(3) A noise rejection capacitor 25 is provided at the output side of the comparator 11c so that occurrence of bit errors caused by the influence of noise superimposed on the output of the comparator 11c can be reduced.

The above measures need not necessarily be applied simultaneously, but a considerable effect can be obtained by applying any of the measures.

Embodiment 5

Figure 5:
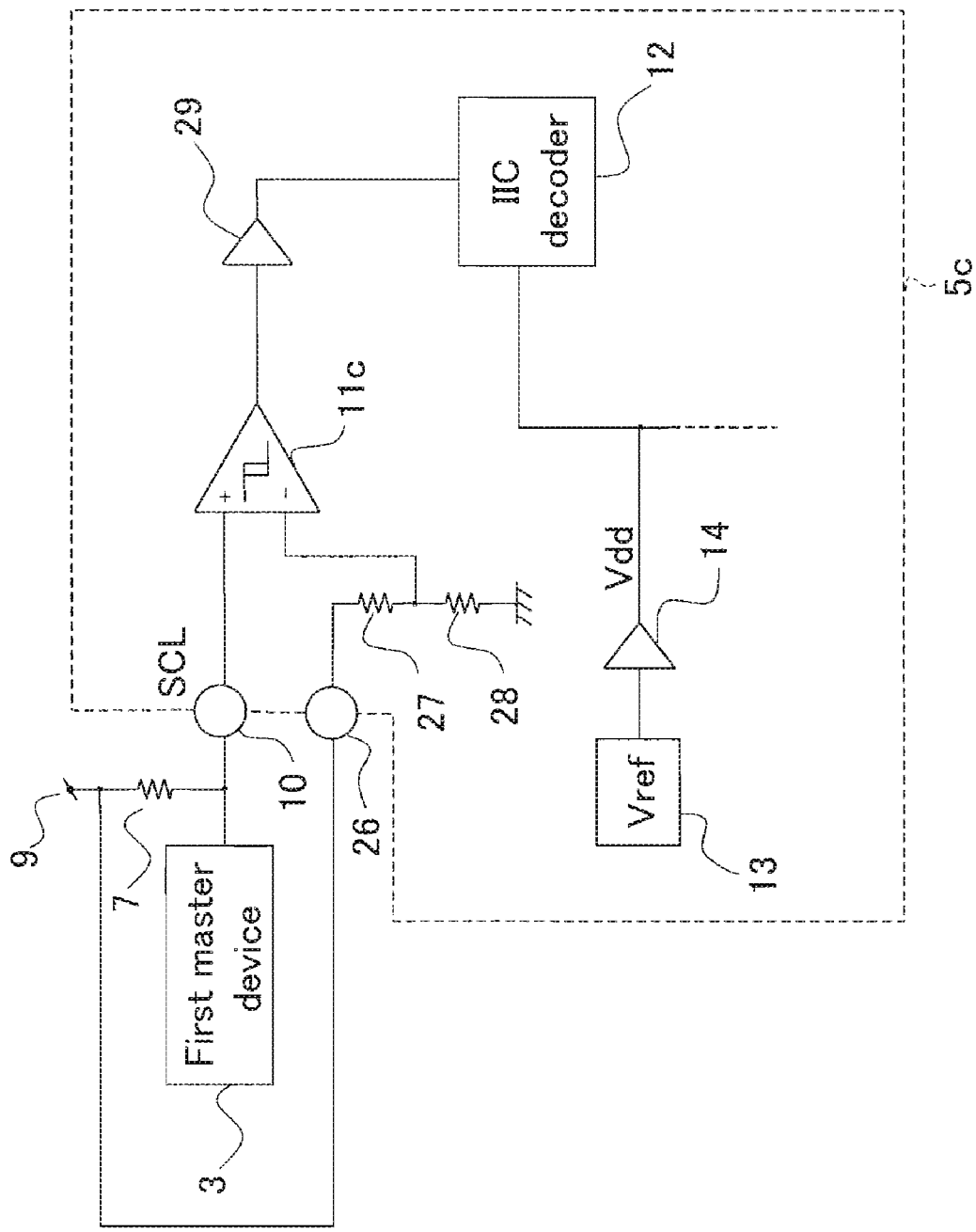
FIG. 5 is a block diagram showing a configuration of a slave IC circuit used in an IIC bus communication system according to a fifth embodiment of the present invention.

FIG. 5 is a block diagram showing a configuration of a slave device 5c used in an IIC bus communication system according to a fifth embodiment of the present invention. The whole configuration of the IIC bus communication system can be similar to the conventional example as shown in FIG. 6A or any of the above-mentioned embodiments. This slave device 5c is shown only at the parts relating to processing a SCL signal to be inputted through the SCL input terminal 10, and parts relating to processing other signals are omitted in the figure.

This slave device 5c is provided with a power source terminal 26 and connected to a power source 9. The power source terminal 26 is grounded via a series circuit of reference-voltage setting resistors 27, 28. A SCL signal inputted through the SCL input terminal 10 is inputted into the hysteretic comparator 11c. An output signal from the comparator 11c is supplied to the IIC decoding circuit 12 via the buffer circuit 29, and decoded.

For the reference voltage of the IIC decoding circuit 12, an output voltage of the reference voltage circuit 13 is supplied via the buffer circuit 14. A voltage supplied as the reference voltage of the comparator 11c is the voltage that is obtained by dividing the voltage of the power source 9 by the reference-voltage setting resistors 27, 28.

According to the above configuration, the following measures for improving the noise tolerance inside the slave device 5c will be achieved.

(4) A voltage obtained through resistance division from the power source 9 is used for the reference voltage for the comparator 11c, so that occurrence of bit errors due to the influence of noise superimposed on the reference voltage side of the comparator 11c can be reduced.
(5) An output impedance is lowered by adding a buffer circuit 29 just behind the output line of the hysteretic comparator 11c so as to lower the output impedance, so that occurrence of bit errors caused by superimposition of noise occurring inside the IIC decoding circuit 12 and any other locations can be reduced.

Each of the above embodiments indicates an example where two master devices and two slave devices are connected to bus lines. However, the number of the master devices and the slave devices to be connected to the bus lines will not be limited to two.

According to the present invention, a freeze caused by noise in an IIC bus communication system can be handled efficiently, and thus the present invention is useful in controlling among the devices forming the interior of equipment for household use, for communications, and for industrial use.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An IIC bus communication system comprising:
   two bus lines including a SCL line and a SDA line;
   multiple master devices connected in parallel to the bus lines;
   a STA control line for connecting the multiple master devices; and
   a pullup resistor connected between the STA control line and a power source,
   herein the master devices to start a communication send in advance a recognition signal STA for starting communication to the STA control line for a predetermined period, and
   the master devices in communication stop the SCL when detecting, through the STA control line, that the recognition signal STA is sent.

2. Equipment for a IIC bus communication system, comprising a device that is operated or controlled electrically in the IIC bus communication system according to claim 1, wherein the device is configured as the slave device.

3. An IIC bus communication control method for controlling an IIC bus communication system comprising:
   two bus lines including a SOL line and a SDA line;
   multiple master devices connected in parallel to the bus lines; and
   a STA control line for connecting the multiple master devices,
   wherein the master devices to start a communication send a recognition signal STA for starting communication to all of the remaining master devices in advance for a predetermined period through the STA control line; and
   the master devices in communication control to stop the SCL when detecting that the recognition signal STA is sent.

* * * * *